United States Patent Office

2,927,018
Patented Mar. 1, 1960

2,927,018

PROCESS FOR THE TREATMENT OF COPPER LEACH SOLUTIONS

Clio E. Redemann, Monterey Park, Calif., assignor to The Fluor Corporation, Ltd., Los Angeles, Calif., a corporation of California No Drawing. Application September 21, 1959
Serial No. 840,996

14 Claims. (Cl. 75—108)

The present application is a continuation-in-part of my co-pending application Serial No. 759,384, filed September 8, 1958.

This invention relates generally to the production of copper powder having a low lead and tin content from copper-ammonia-carbon dioxide leach solutions by reducing the copper with a reducing gas such as hydrogen, and is particularly directed to an improved method for the removal of lead and tin from the alkaline copper-containing solution prior to reduction. Illustrative composition ranges for such solutions are as follows (zinc may or may not be present, and the pH of the solutions typically range between about 10 to 12):

| | Grams/liter |
|---|---|
| Copper | 90 to 170 |
| Ammonia | 140 to 180 |
| Carbon dioxide | 90 to 130 |
| Zinc | 0 to 60 |
| Lead | 0.2 to 4.0 |
| Tin | .05 to 2.0 |

The process most commonly employed for producing a copper powder of low lead content is to reduce the copper-containing solution, along with its content of soluble lead and tin compounds, without purification prior to reduction. Subsequent to reduction the lead impurity, but not the tin impurity co-produced in the reduction stage, is removed from the copper powder by washing the powder with an aqueous acetic acid solution containing 5 percent to 20 percent acetic acid. Using this process a copper powder customarily containing about 0.05 percent lead and variable amounts of tin is obtained, although lead contents both larger and smaller may be obtained depending upon such factors as acetic acid concentration, time and temperature of the acid washing, amount of lead initially present in the solution, etc. While this process gives moderately satisfactory results, it is necessary to either recover or purify the acetic acid if the process is to be economically sound.

Another type of process in which the lead may be removed prior to reduction of the copper-bearing solution, consists of heating the liquor to an elevated temperature at autogenous pressure (the pressure is quite large because of the decomposition of the ammonium carbonate at this temperature) and holding the solution at this temperature under pressure for a suitable time. This solution is then filtered through a micro-porous stainless steel filter to remove the precipitated lead oxide or other lead compound. While this process can be made to operate on a small scale in batch operation, it is fraught with mechanical difficulties when an attempt is made to apply it on a large scale to a continuous operation. The micro-porous stainless steel filter soon becomes blocked by the slimy precipitate, and because of the large pressure drop which then develops across the filter surface the slime is driven into the pores of the filter so firmly that it cannot be removed in any convenient manner.

While lead carbonate and lead sulfate are both very sparingly soluble compounds, it is not possible to remove lead from these copper-ammonia-carbon dioxide solutions merely by adding a soluble sulfate to the solution. This phenomenon is attributed to several causes all acting together; the lead and tin combine to form some soluble unionized substance, possibly in the nature of stannous or stanic plumbite; very little free carbonate ion exists in this solution as the ammonia and carbon dioxide combine largely to give ammonium carbamate, the ammonium salt of carbamic acid; in alkaline solution (pH about 11) the simple lead ion is extensively converted into the plumbite ion. This combination of circumstances leads to a lead and tin content both many times as large as would be predicted on the basis of their solubility in water.

The present invention has for its general object to accomplish the simultaneous removal of both lead and tin from copper-ammonia-carbon dioxide leach liquors, prior to their reduction by hydrogen or other reducing gas. This process has advantages not apparent solely in the purity of the product. For example, the removal of these impurities at an early stage in the process considerably diminishes the fouling of surfaces in the heat exchangers. Since there is no longer need for the acetic acid wash, certain items of equipment may be eliminated or replaced by less expensive equipment at a different point in the process.

The invention contemplates adding a soluble oxalate, or both soluble oxalate and sulfate, to the leach liquor in quantity several times as large as the lead content of the solution, followed by the addition of a solution of a water soluble salt or hydroxide of strontium, barium or calcium, of which strontium salts, such as strontium nitrate, strontium acetate or strontium hydroxide are preferred. The strontium oxalate, or oxalate and sulfate, which forms under these conditions slowly equilibrates with the lead content of the solution thus removing it from solution. As the lead is removed from solution the lead-tin complex is decomposed permitting the tin to precipitate, probably as metastannic acid. Thus both the tin and lead are removed by the same procedure. Since the solubilities of neither strontium oxalate (or strontium oxalate together with strontium sulfate) or lead oxalate (or lead oxalate together with sulfate) change very rapidly with the temperature, it is possible to employ this process over a wide temperature range of 10–100° C., but for practical considerations it is preferred to operate at near or slightly above ambient temperatures.

Various soluble oxalates which give appreciable quantities of the oxalate ion in solution may be employed. Of these the readily soluble oxalic acid and alkali metal oxalates including sodium, potassium, lithium and ammonium oxalates are preferred. Any of these may be used alone or together with a soluble sulfate such as sulfuric acid, ammonium sulfate, copper sulfate, zinc sulfate, sodium, potassium and lithium sulfates, and those organic sulfates which are salts of substituted ammonias, such as methylammonium or isopropylammonium sulfates. Since the present invention is primarily directed to the use of the oxalates, the process will be described in terms of conditioning the rich leach liquor by the addition of an oxalate, with the understanding that some of the oxalate may be substituted by soluble sulfate, the particular use of which is dealt with in the co-pending Redemann and Tschirner application Serial No. 759,405. However, from the standpoint of cost and convenience, sulfuric acid or ammonium sulfate are to be preferred. The quantity of oxalate added may be varied over a considerable range, but preferred operation is over the range one to ten times as many moles of soluble oxalate (or combined oxalate and sulfate) as the moles of e.g. soluble strontium salt used. Increasing the quantity of strontium favors the lead and tin removal, but economic factors cause one to seek a balance between operating cost and complete lead removal. An oxalate ion concentration of 5–20 grams per liter is frequently satisfactory. The soluble oxalate should be added before the strontium or other precipitating salt is added.

Only strontium, barium and calcium appear to give insoluble salts which are capable of co-precipitating lead from solution. Several conditions must be met here. First, the precipitated oxalates must be insoluble; second, the ionic radius of the lead ion and the co-precipitating ion should be of similar size and charge; third, the crystal system should be the same or very similar for the lead oxalate and the co-precipitating oxalate. Any readily soluble salts of strontium, barium or calcium can be used; for example, nitrate, acetate, formate, chloride, bromide, etc. Likewise, the hydroxides can be used when sufficiently soluble. The chloride and bromide are less desirable because of the serious corrosion problems they would introduce and their tendency to form slightly ionized lead salts.

The quantity of the soluble precipitating compound to be added is largely determined by two factors: How low a lead content is desired in the purified leach liquor, and the quantity of lead initially present. A practical level of precipitating compound (typically strontium) addition was found to be 2.25 grams of strontium per gram of lead initially present. However, both larger and smaller amounts may be employed within the scope of this invention. The addition of lesser amounts of strontium serves to remove a smaller portion of the contained lead, while the addition of a larger ratio of strontium to lead will more completely remove the lead. The tin concentration follows the lead somewhat, although it appears to drop somewhat more rapidly. Practical limits may be defined as 1.0 to 8.0 grams of strontium, barium or calcium (in the form of a soluble salt or hydroxide) per gram of lead in the leach liquor.

It has been discovered that the soluble oxalate (or oxalate and sulfate) must be added prior to the addition of the soluble precipitating compound. Reversing the order of addition greatly impairs the efficiency of lead and tin removal. Further, it has been found that the soluble precipitating salt may be added as a single portion, in divided portions or continuously, the preferred method depending upon other features of the process design. Since this is a co-precipitation process in which the strontium, barium or calcium always predominates, it is necessary to employ the precipitating compound in appreciable excess.

The following examples illustrate the application of the process to a rich copper leach liquor:

Example I

One liter of rich leach liquor having the composition

| | Grams/liter |
|---|---|
| Copper | 160 |
| Zinc | 17.8 |
| Ammonia | 140 |
| Carbon dioxide | 112 |
| Lead | 0.48 |
| Tin | 0.08 | was adjusted to an oxalate content of 14 grams/liter by adding oxalic acid. Strontium nitrate was added as a 16 percent solution at the rate of 1.1 grams of strontium per liter. This solution was stirred during the periods of time recited below. After each period, samples of solution were collected, filtered, and analyzed for their lead content. The results were as follows:

| Time of stirring, hrs.: | Percentage lead removal |
|---|---|
| 2 | 90 |
| 4 | 90 |
| 6 | 90 |

All the tin precipitated with the lead. (A blank determination in which no strontium was added to the oxalate-containing leach liquor showed that no lead was removed from the solution.)

Example II

One liter of rich liquor having the same concentrations of lead, tin, copper, zinc, carbon dioxide, and ammonia as given in Example I was adjusted to an oxalate ion content of 14 grams per liter by adding the calculated quantity of ammonium oxalate. Strontium acetate was added as 27.5 percent solution of the hemi-hydrate of strontium acetate at the rate of 1.12 grams of strontium per liter of solution. The resulting solution with its suspended solid phase was stirred at 25° C. for periods of time indicated below. After each period of time, a sample of the solution was withdrawn, filtered, and the filtrate was analyzed for its lead content. The following results were obtained:

| Time of stirring, hrs.: | Percentage lead removal |
|---|---|
| 2 | 69.6 |
| 4 | 69.6 |
| 6 | 79.3 |

A blank determination in which no strontium was added to the oxalate-containing leach liquor showed that no lead was removed unless the strontium were present.

Example III

One liter of plant liquor having the following composition

| | Grams/liter |
|---|---|
| Copper | 150 |
| Carbon dioxide | 113 |
| Ammonia | 173 |
| Zinc | 13.7 |
| Lead | 0.9 |
| Tin | 0.08 |
| Sulfate | 2.34 | was adjusted to contain 20 grams per liter of ammonium oxalate. This makes the sum of the sulfate and oxalate ion content equal to 16.1 grams per liter if one assumes complete ionization. Strontium chloride was added as a 12 percent aqueous solution until the strontium added corresponded to 1.15 grams per liter. After stirring for four hours, a sample of the solution was withdrawn, filtered, and analyzed for its lead and tin content. These analyses showed that 69.6 percent of the lead had been removed and no tin could be detected which indicated that more than 90 percent of the tin had been removed.

The invention is characterized by the discovery that the sequential addition of the soluble oxalate and alkaline earth compounds to a carbonate solution which initially had, and thereafter retained through the precipitation, a pH within about the 10–12 range, can accomplish removal of both lead and tin from the solution. The results are surprising since calcium and strontium carbonates are less soluble than the respective oxalates, and in the case of barium, the oxalate is only slightly less soluble than the carbonate. It was demonstrated that the carbonates were ineffective alone. However, when oxalate was added to the liquor prior to the addition of the soluble alkaline earth compound, it was found that the character of the precipitate changed and at the same time lead was removed from solution. A totally unexpected phenomenon was that tin was removed along with the lead. This was a desirable consequence (since tin is an undesirable impurity in high purity copper) of the procedure that was not anticipated. It is thought that the tin and lead stay in solution as some type of unionized but soluble complex, such as stannic or stannous plumbite. However, when the lead is removed, this complex is destroyed and the tin separates apparently as a sparingly soluble hydrated oxide.

The workability of strontium hydroxide, and its chemical similarity to the salts, become apparent upon consideration that water may be regarded as a weak acid because of its partial auto-ionization into a proton and a negative ion as follows:

$$HOH \rightleftarrows H^+ + OH^-$$

As a result of this ionization, metal hydroxides may be viewed as salts of the weak acid water. The only uniqueness about this situation arises from the fact that water is employed as a solvent in many processes, which causes hydroxides to be regarded as unique compounds. However, if liquid ammonia or triethylamine were used as solvents, sodium hydroxide would behave as a salt of a weak acid similar to the salts sodium phenolate or sodium cyanide. Likewise, strontium hydroxide is also a salt of a weak acid and may be considered as similar to other strontium salts. According to Siedel—"Solubilities of Inorganic and Metal Organic Compounds," vol. I, p. 1517, Third Edition, D. van Nostrand Company, Inc. (1940), the solubility of strontium hydroxide octahydrate is 17.4 grams per liter at 20° C., a value large enough to permit the use of the compound for the co-precipitation of lead and tin with strontium sulfate or oxalate.

The basicity of the hydroxide creates essentially no different chemical considerations than the salts with respect to a leach liquor of the kind described, because there is an excess of ammonia over that required to react stoichiometrically with the sum of the carbonate sulfate, oxalate or other ions in the solution. This means that there will also be a substantial amount of $NH_4OH$ present in the solution from the hydration of the excess ammonia. Hence, no substantial change in pH of the solution is to be expected when small mole-fractions of strontium hydroxide are added to said leach liquor due to one or more of the following reactions taking place:

(1) $Sr(OH)_2 + (NH_4)_2CO_3 \rightleftarrows SrCO_3 + 2NH_4OH$ (2) $Sr(OH)_2 + (NH_4)SO_4 \rightleftarrows SrSO_4 + 2NH_4OH$ (3) $Sr(OH)_2 + (NH_4)_2C_2O_4 \rightleftarrows SrC_2O_4 + 2NH_4OH$ This is true because the addition of a small amount of additional $NH_4OH$ will not produce any significant change in pH or other variables essential to the success of the process.

I claim:

1. The process of recovering lead and tin from rich alkaline leach liquor solutions containing copper, ammonia, carbon dioxide, lead and tin, that includes adding to said solution a water soluble oxalate, adding to the oxalated and still alkaline solution a precipitating compound of the group consisting of water soluble salts of strontium, barium and calcium and hydroxides of strontium, barium and calcium, and thereby simultaneously precipitating separable tin and lead compounds from the solution.

2. The process of claim 1, in which the mole ratio of the soluble oxalate to added precipitating compound is between 1 to 10, to 1.

3. The process of claim 1, in which said precipitating compound is added in the ratio of from about 1.0 to 8.0 grams of the metallic cation thereof to 1 gram of lead in said leach liquor.

4. The process of claim 1, in which said precipitating compound is added in the ratio of from about 1.0 to 8.0 grams of the metallic cation thereof to 1 gram of lead in said leach liquor, and the mole ratio of the soluble oxalate to the precipitating compound is between 1 to 10, to 1.

5. The process of claim 4, in which a water soluble sulfate also is added to the solution in advance of the precipitating compound addition, and in which the mole ratio of total oxalate and sulfate to the precipitating compound, is within said ratio of 1 to 10, to 1.

6. The process of claim 4, in which initially and throughout the precipitation, said rich lquor solution has a pH between about 10 to 12.

7. The process of claim 5, in which initially and throughout the precipitation, said rich liquor solution has a pH between about 10 to 12.

8. The process of claim 4, in which zinc is present in the leach liquor and the precipitated lead and tin compounds are substantially free from zinc.

9. The process of claim 4, in which said soluble oxalate is oxalic acid.

10. The process of claim 4, in which said soluble oxalate is ammonium oxalate.

11. The process of claim 4, in which said precipitating compound is a strontium salt.

12. The process of claim 4, in which said precipitating compound is strontium nitrate.

13. The process of claim 4, in which said precipitating compound is strontium acetate.

14. The process of claim 5, in which said precipitating compound is a strontium salt.

References Cited in the file of this patent
UNITED STATES PATENTS

| | | |
|---|---|---|
| 1,484,088 | Schumacher | Feb. 19, 1924 |
| 2,695,226 | Lebedeff | Nov. 23, 1954 |